No. 871,478. PATENTED NOV. 19, 1907.
H. P. CHILDRESS.
COTTON PICKER.
APPLICATION FILED MAR. 23, 1906.
2 SHEETS—SHEET 1.
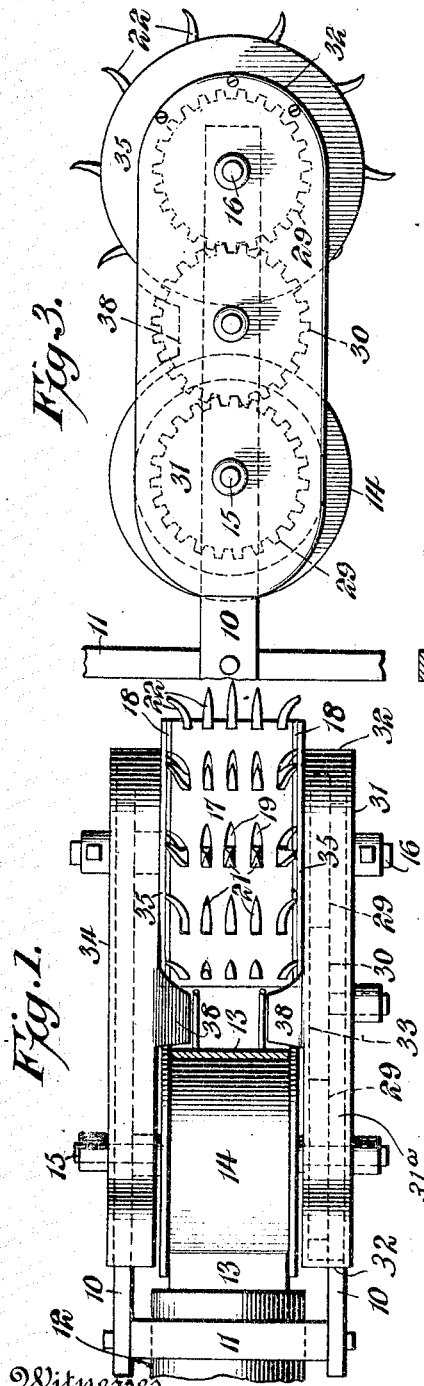
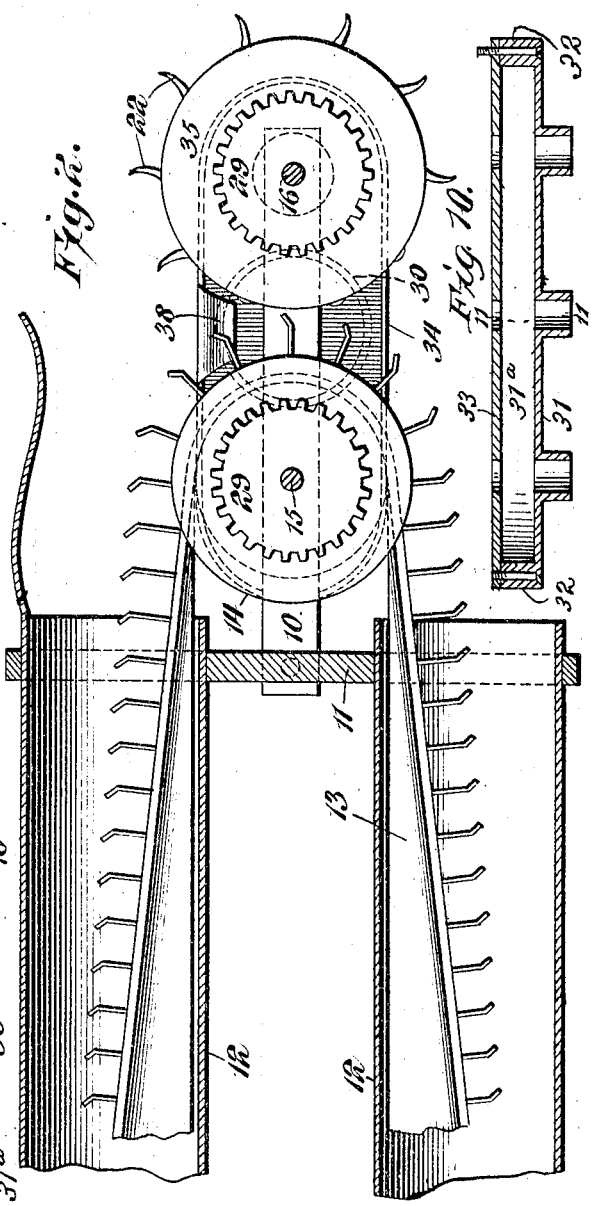
Henderson P. Childress, Inventor,
Witnesses

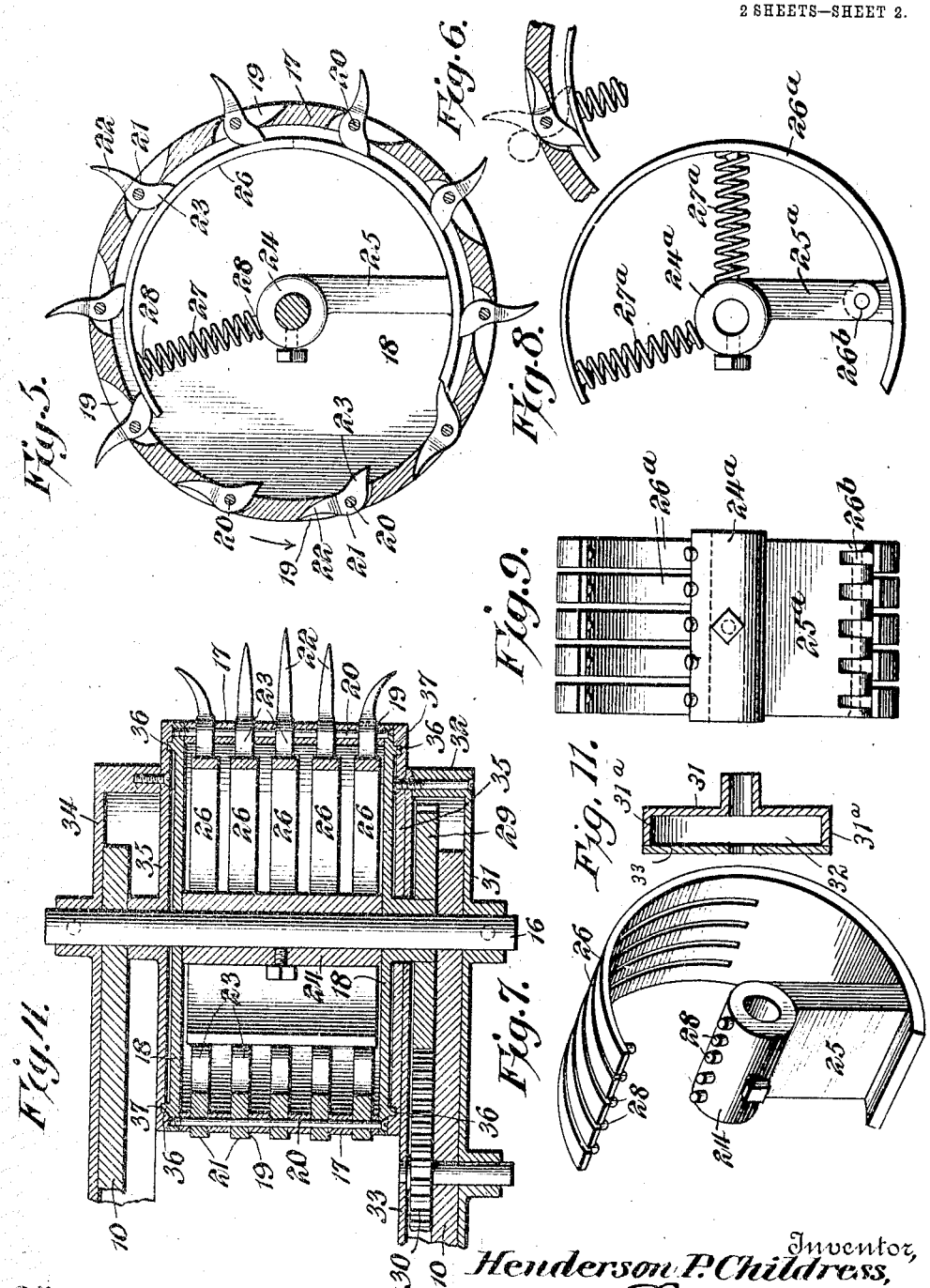

UNITED STATES PATENT OFFICE.

HENDERSON P. CHILDRESS, OF NEW YORK, N. Y.

COTTON-PICKER.

No. 871,478.

Specification of Letters Patent.

Patented Nov. 19, 1907.

Application filed March 23, 1906. Serial No. 307,651.

*To all whom it may concern:*

Be it known that HENDERSON P. CHILDRESS, a citizen of the United States, residing at New York, in the county of New York and State of New York, has invented a new and useful Cotton-Picker, of which the following is a specification.

The present invention relates more particularly to the means for detaching the cotton from the plants.

Experience has shown that in mechanical picking devices, comparatively strong picking fingers are essential, for otherwise they become bent in the engagement with the stout stalks and branches of the plant, and at the same time, if the teeth are made sufficiently strong, it is found very advantageous to have them so arranged that they will yield, if they do strike obstructions, in order to release the same and avoid damage to the mechanism and the plant.

The principal object therefore of the present invention is to provide a novel picker, which will be strong and effective in operation, will automatically release itself from obstructions, will properly deliver the picked cotton to the picking mechanism, and will not become clogged with lint.

Another object is to provide a picker device that will operate throughout its width, to provide means that will center the cotton on the conveyer belt, and to provide driving means that is entirely inclosed and protected against the entrance of dust, dirt, lint and the like.

In the accompanying drawings:—Figure 1 is a top plan view of the new picker. Fig. 2 is a vertical sectional view through the same. Fig. 3 is a side elevation of the picking and driving means therefor. Fig. 4 is a horizontal sectional view through the picking device. Fig. 5 is a vertical sectional view through the same. Fig. 6 is a detail sectional view showing one of the fingers thrown back. Fig. 7 is a detail perspective view of the finger projecting means. Fig. 8 is a side elevation of a modified form of the same, and Fig. 9 is an end elevation of the structure disclosed in Fig. 8. Fig. 10 is a longitudinal sectional view through the gear casing. Fig. 11 is a cross sectional view on the line 11—11 of Fig. 10.

Similar reference numerals designate corresponding parts in all the figures of the drawings.

In the embodiment illustrated, a pair of spaced supports, preferably in the form of bars 10, are employed, which are carried by a bracket 11, mounted on spaced tubes 12 of the conveyer. Through these tubes operates a toothed conveyer belt 13, which passes about a pulley 14, secured to a shaft 15, journaled in the supporting bars 10. Said belt also constitutes a driver for the pulley and shaft. Mounted on the supporting bars 10, in advance of and spaced from the belt and pulley, is the picking device, which is preferably constructed as follows.

A stationary axle 16 extends across the space between the bars 16, and is secured against rotation. On this axle is rotatably journaled a drum, the same comprising a peripheral wall 17 and heads 18 abutted against the walls and rotatable on the axle. The peripheral wall is provided with openings 19, and pivot screws or bolts 20, passing through the wall, also extend across the openings. These bolts or pivots engage the heads 18, and thus constitute tie devices for securing the parts of the drum together. A plurality of transverse series of picking teeth 21 are located in the openings 19, and are loosely journaled between their ends on the pivots 20, the teeth thus forming annular rows, any number of which may be employed, as desired. Their outer end portions 22 are preferably curved and pointed, while their inner portions 23 are disposed in angular relation to the outer portions 22.

Mechanism is located within the drum for maintaining the teeth in projecting relation with respect to said drum during a portion of their rotation. In the embodiment disclosed in the first seven figures, a hub 24 is employed that is suitably fixed to the axle 16, and has a web 25 extending from one side of the same. Secured to this web are a plurality of independent curved tracks 26 that are of yielding material, said tracks being each supported contiguous to one end by the web, and extending around the inner side of the peripheral wall, adjacent thereto. The ends of the tracks are spaced some distance apart, as clearly shown in Figs. 5 and 7. Coiled springs 27 are interposed between the free ends of the tracks, and the hub, being held in place by any suitable means, as for instance, lugs 28 that engage the ends of said springs. Each track is disposed in line with one of the annular rows of teeth and in the path of movement of the inner portions 23 of said teeth, so that as long as the teeth are over the tracks, they are maintained in projecting relation, but when they are disposed between the ends of said tracks, they are free to turn rearwardly without resistance. This will be clear by reference to Fig. 5. At the same time, the tracks are yielding, so that if any of the projecting teeth strike any material resistance or obstruction, the same can turn rearwardly, forcing the tracks inwardly, in which case, they will assume the relation shown in Fig. 6.

Instead of the structure above described, the embodiment illustrated in Figs. 8 and 9 may be employed. In this form, a hub 24$^a$ is employed, having a web 25$^a$, and the tracks 26$^a$ are hinged as shown at 26$^b$ to said web. The tracks are, however, yieldably maintained in their outer positions by springs 27$^a$ interposed between the tracks and the hub 24$^a$. The operation of this modification is substantially the same as that of the embodiment already described.

The picking device is rotated from the shaft 15, the motion of the latter being transmitted to the former through suitable gearing. In the present embodiment, this gearing comprises gear wheels 29, one of which is secured to the shaft 15, the other being connected to the drum. An idler pinion 30 is interposed between and is in mesh with said gear wheels. The gearing is completely inclosed in order to protect it from the dirt, dust, lint and the like, and for this purpose, a casing is employed, comprising an outer wall 31 disposed outside the bar 10, top and bottom walls 31$^a$ and end walls 32, and an inner wall or partition 33 located on the inner side of the gearing and extending between the same and the drum. A casing wall 34 is also preferably arranged outside the opposite supporting bar 10. Interposed between these two casings are bearing disks 35, secured to said casings and arranged between the same and the heads 18 of the drum. The disks 35 are held against rotation, and have bearings against the drum head. The adjacent disk and head at each end of the drum are provided, one with a circular rib 36, the other with a circular recess 37 receiving the same.

In order that the picker teeth 22 will operate throughout an area equal to the width of the drum, the outer teeth are preferably inclined outwardly, as shown, so that their outer ends are disposed in substantially the same planes as the drum heads. The openings and seats for the teeth are correspondingly shaped. Means are also provided for centering the picked cotton upon the conveyer belt 13. This means comprises downwardly and inwardly inclined lips 38 arranged between the picker and conveyer and carried by the side casings.

The operation of the structure may be briefly described as follows: By having the tracks 26 arranged on the outer side of the axle 16, it will be apparent that the teeth, as they travel around the outer side of the drum are maintained in projecting relation, but as they pass the inner ends of the tracks, they are released, so that they can freely swing backwardly in passing the conveyer belt. The point of release can be readily varied by adjusting the axle and the tracks carried thereby. It will thus be apparent that if the rotary picker is presented to a cotton boll, the projecting teeth will engage and extract the cotton therefrom, delivering it to the conveyer belt, the lips 38 centering the cotton as it is taken by the belt from the teeth. When the teeth pass the belt, they are free to swing backwardly, and consequently the cotton will be disengaged therefrom with very little liability of the lint becoming caught or clogging the same. When the teeth reach the lower ends of the tracks, said ends being disposed in the paths of movement of their inner ends 23, will cause them to again swing to and lock in their projecting relation. Should one or more of the teeth engage a branch or the like, the resistance offered thereby will cause the particular teeth engaged, to swing rearwardly to inoperative positions, in which position they will be locked until released. Moreover, while the resistance to the swinging motion is at first very great, it gradually weakens towards the free ends of the tracks, and consequently the teeth can more readily turn at said ends, so that there is no danger of the stalks or other obstructions being carried down against the side supports or casings. Moreover, as each tooth is capable of an independent swinging movement, the movement of the same to an inoperative position does not in any manner affect the operation of the others. The joints or bearings at the ends of the drum are also important, as they prohibit the winding of the lint upon the bearings, and thereby eliminate friction and wear to a very material degree.

From the foregoing, it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In a cotton picker, the combination with a rotary support, of transversely disposed sets of teeth pivotally mounted on the support, each tooth of each set having independent swinging movements, and means for maintaining the teeth in projecting relation during a portion of their rotation, said means permitting the independent movement of each tooth to an inoperative position independently of the other teeth.

2. In a cotton picker, the combination with a rotary support, of transversely disposed pivots mounted on the support, independently swinging teeth loosely journaled on the pivots, and means engaging the teeth for yieldingly maintaining them in projecting relation during a portion of their rotation, said means permitting the independent movement of each tooth to an inoperative position independently of the other teeth.

3. In a cotton picker, the combination with a rotary drum comprising a peripheral wall and heads located at the ends of the wall, of a pivot device passing through the wall and secured to the heads, said heads being fastened to the wall by said pivot device, and a plurality of independently swinging teeth journaled on the pivot device.

4. In a cotton picker, the combination with a drum comprising a tubular peripheral wall having a transverse series of openings therethrough, and heads detachably located at the ends of the peripheral wall, of pivots passing through the peripheral wall and the openings thereof, said pivots having their ends secured in the heads, and said heads being fastened to the peripheral wall by the pivots, and a plurality of independently swinging teeth located in the openings of the peripheral wall and journaled on the pivots.

5. In a cotton picker, the combination with a rotary support, of a plurality of annular rows of independently swinging teeth mounted on the support and disposed side by side, each tooth being pivoted between its ends, and means engaging the inner portion of each tooth during a portion of its rotation to maintain the outer portion of the same in projecting relation.

6. In a cotton picker, the combination with a rotary support, of a plurality of annular rows of swinging teeth pivotally mounted on the support, and separate devices located in the path of movement of the teeth of each annular row for maintaining said teeth in projecting relation during a portion of their rotation.

7. In a cotton picker, the combination with a drum comprising a peripheral wall having openings, and detachable heads located at the ends of the wall, of pivots passing through the wall and engaging the heads to hold the same in place, said pivots extending across the openings, independently swinging teeth located in the openings of the wall and loosely journaled on the pivots, and a plurality of curved tracks located within the drum and respectively disposed in the path of movement, of different teeth.

8. In a cotton picker, the combination with a stationary axle, of a drum rotatable about the same, a plurality of sets of independently swinging teeth journaled between their ends in the drum, and projecting means for the teeth secured to the axle and located within the drum in the path of movement of the inner portions of the teeth.

9. In a cotton picker, the combination with spaced supports, of an axle mounted on the supports and extending across the space between them, means for securing the axle against rotation a drum journaled upon the axle and including a peripheral wall having openings, independently swinging teeth pivoted between their ends in the openings and rotatable with the drum, and tracks secured to the axle and located within the drum, said tracks being disposed in the path of movement of the inner portions of the teeth.

10. In a cotton picker, the combination with a rotatable support, of a picking tooth pivotally mounted thereon, and means held against rotation and movably engaged by the tooth for yieldably maintaining said tooth in projecting relation with respect to the support during a portion of its rotation.

11. In a cotton picker, the combination with a rotary drum, of a plurality of sets of teeth pivoted on the drum, and means held against rotation within the drum and located in the path of movement of the teeth for yieldingly maintaining said teeth in projecting relation with respect to the drum during a portion of their rotation.

12. In a cotton picker, the combination with a stationary axle, of a drum rotatable about the same, a plurality of sets of independently swinging teeth journaled between their ends on the drum, and yieldable means for maintaining the teeth in projecting relation with respect to the drum during a portion of their rotation, said means being secured against rotation to the axle and located within the drum in the path of movement of the inner portions of the teeth.

13. In a cotton picker, the combination with a rotary drum, of a plurality of annular rows of swinging teeth pivoted on the drum, and separate yielding supports located within the drum and engaging the teeth for maintaining said teeth of each row in projecting relation during a portion of their revolution.

14. In a cotton picker, the combination with a rotary drum, of a plurality of annular rows of swinging teeth pivoted between their ends on the drum, and a plurality of separate yieldable tracks located within the drum in the path of movement of the inner portions of the teeth.

15. In a cotton picker, the combination with a stationary axle, of a drum rotatable about the same and having a peripheral wall, provided with openings, transverse series of independently swinging teeth pivoted on the drum between their ends and disposed in annular rows, a supporting web secured to the axle within the drum, a plurality of yieldable tracks carried by the web and located within the drum, said tracks being respectively located in the paths of movement of the inner portions of teeth, and springs supporting said tracks.

16. In a cotton picker, the combination with a rotatable picking drum, of a plurality of teeth rotatable with the drum and movably mounted thereon, and non-rotatable means engaging the teeth for yieldingly maintaining them in projecting relation with respect to the drum.

17. In a cotton picker, the combination with a rotatable picking drum, of a plurality of teeth rotatable with the drum and movable into and out of projecting relation with respect thereto, and means held stationary within the drum and engaged by the teeth for yieldably maintaining said teeth in projecting relation during a portion of their rotation.

18. In a cotton picker, the combination with a rotary drum, of a plurality of teeth movably mounted on the drum, certain of said teeth projecting outwardly toward the ends of said drum.

19. In a cotton picker, the combination with a rotary drum, of a plurality of teeth pivoted on the drum and projecting at an inclination outwardly toward the ends of the drum.

20. In a cotton picker, the combination with a rotary drum, of a series of teeth extending transversely of the drum, said teeth being pivoted on the drum and the end teeth of the series projecting outwardly at an inclination toward the ends of the drum.

21. In a cotton picker, the combination with spaced supports, of a picking drum journaled between the supports and having heads and picking teeth, and bearing disks located adjacent to the heads, said disks having their inner portions spaced from the heads and having marginal bearing engagements with the marginal portions of the outer sides of the heads.

22. In a cotton picker, the combination with spaced supports, of a drum journaled between the same and having heads, and bearing disks mounted on the supports adjacent to the heads, each head and adjacent disk being provided, one with a circular rib, the other with a corresponding recess that receives the rib.

23. In a cotton picker, the combination with a support, of a casing carried by one side of the support and comprising inner and outer side walls, end walls and a top and bottom, a driving shaft extending across the support and having one end projecting into the casing, a cotton carrying belt passing about the driving shaft, a picking drum journaled on the support in advance of the driving shaft and having a shaft disposed in substantially parallel relation to the driving shaft and projecting into the casing, and gearing located within the casing and connecting the shafts for transmitting power from one to the other.

24. In a cotton picker, the combination with a carrier belt, of a rotary picker disposed in advance of and spaced from the belt, and guides located in the space between the picker and belt and projecting inwardly and downwardly towards each other.

25. In a cotton picker, the combination with a rotary support, of a plurality of independently swinging teeth mounted on the support, each tooth being pivoted between its ends and having a swinging movement transversely of its length, and means engaging the inner portion of each tooth during a portion of its rotation to maintain the outer portion of the same in projecting relation, said means permitting the movement of the tooth to an inoperative position independently of the other teeth.

26. In a cotton picker, the combination with a rotary support, of a plurality of swinging teeth mounted on the support, and means for yieldingly maintaining the teeth against their swinging movements and in projecting relation with respect to the support, said means normally preventing the swinging movement of the teeth but permitting said swinging movement of said teeth to an inoperative position when the same strike an obstruction.

27. In a cotton picker, the combination with a rotary drum having a peripheral wall, of a plurality of swinging teeth mounted on the drum and projecting through the peripheral wall, said teeth swinging transversely of their length and rearwardly on the outer side of said wall to an inoperative position, and means for yieldingly maintaining the teeth against their swinging movement and in their operative positions, said means permitting the movement of the teeth to an inoperative position when engaged with an obstruction.

In testimony that I claim the foregoing as my own, I have hereto affixed my signature in the presence of two witnesses.

HENDERSON P. CHILDRESS.

Witnesses:
JOHN H. SIGGERS,
ST. GEORGE PATE.